US012428339B2

(12) United States Patent
Lee et al.

(10) Patent No.: US 12,428,339 B2
(45) Date of Patent: Sep. 30, 2025

(54) METHOD OF REPAIRING GLASS FOR DISPLAY DEVICE

(71) Applicant: Samsung Display Co., LTD., Yongin-si (KR)

(72) Inventors: Jaeho Lee, Seongnam-si (KR); Mincheol Kim, Seoul (KR); Myunghun Baek, Hwaseong-si (KR); Sookkyung You, Seoul (KR); Hyun-Il Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 433 days.

(21) Appl. No.: 17/868,705

(22) Filed: Jul. 19, 2022

(65) Prior Publication Data

US 2023/0022346 A1    Jan. 26, 2023

(30) Foreign Application Priority Data

Jul. 20, 2021   (KR) .................. 10-2021-0094895

(51) Int. Cl.
    *C03C 23/00*    (2006.01)
(52) U.S. Cl.
    CPC .................. *C03C 23/0025* (2013.01)
(58) Field of Classification Search
    CPC .................. C03C 23/0025; C03C 25/6208
    See application file for complete search history.

(56) References Cited

U.S. PATENT DOCUMENTS 6,048,255 A * 4/2000 Kuo .................. G11B 5/8404
                                                         451/63
6,130,401 A * 10/2000 Yoo .................. C03B 33/091
                                                       219/121.72

(Continued)

FOREIGN PATENT DOCUMENTS

CN    112935533 A  *  6/2021 ........... B23K 26/142
JP    S5622657 A   *  3/1981  ......... C03C 23/0025

(Continued)

OTHER PUBLICATIONS

American Society of Heating, Refrigerating and Air-Conditioning Engineers, Inc. (2017), 2017 ASHRAEÂ®—Handbook—Fundamentals (I-P Edition), American Society of Heating, Refrigerating and Air-Conditioning Engineers, Inc. (ASHRAE); chapter 33 sections 33.3 and 33.4 (Year: 2017).*

(Continued)

*Primary Examiner* — Erin Snelting
(74) *Attorney, Agent, or Firm* — CANTOR COLBURN LLP

(57) ABSTRACT

A method of repairing a glass of a display device includes disposing the glass including a first surface, a second surface opposite to the first surface, and a scratch formed on the first surface, the scratch facing toward a gravitational direction, disposing a heating plate on the first surface of the glass, and irradiating a laser on the second surface. A transmittance rate of the laser passing through the glass is greater than an absorption rate of the laser being absorbed in the glass. A portion of the laser irradiated to the second surface reaches the heating plate. The laser reaching the heating plate generates heat. Heat is transmitted to the glass. A portion of the glass adjacent to the scratch is melted by the heat. The portion of the melted glass fills the scratch.

20 Claims, 14 Drawing Sheets

(56) References Cited

U.S. PATENT DOCUMENTS

| | | | |
|---|---|---|---|
| 10,427,968 B2 * | 10/2019 | Dai | ............ C03C 17/22 |
| 11,066,320 B2 | 7/2021 | Lee et al. | |
| 2010/0315704 A1 * | 12/2010 | Ono | ............ G21K 1/062 |
| | | | 359/359 |
| 2021/0255667 A1 | 8/2021 | Lee et al. | |

FOREIGN PATENT DOCUMENTS

| | | | | |
|---|---|---|---|---|
| JP | H0371991 A * | 3/1991 | ............ | B23K 26/18 |
| JP | H0616440 A * | 1/1994 | ............ | B01J 19/12 |
| JP | 2001-357516 | 12/2001 | | |
| JP | 2006206372 A * | 8/2006 | ............ | C03B 23/203 |
| KR | 10-2019-0018114 | 2/2019 | | |
| KR | 10-2020-0018742 | 2/2020 | | |
| KR | 10-2021-0103629 | 8/2021 | | |

OTHER PUBLICATIONS

Dossett, Jon L et. al., ASM Handbook, vol. 04A—Steel Heat Treating Fundamentals and Processes—34.4 Laser Scanning Technology, 2013 (Year: 2013).*

* cited by examiner

METHOD OF REPAIRING GLASS FOR DISPLAY DEVICE

CROSS-REFERENCE TO RELATED APPLICATION(S)

This application claims priority from and the benefit of Korean Patent Application No. 10-2021-0094895, filed on Jul. 20, 2021, which is hereby incorporated by reference for all purposes as if fully set forth herein.

BACKGROUND

Field

Embodiments of the invention relate generally to a method of repairing a glass for a display device and, more specifically, to a method of repairing scratches of a glass for a display device.

Discussion of the Background

As technology is improved, display devices having smaller sizes, lighter weight, and superior performance have been produced. A cathode ray tube television, which is one of the display devices, has been widely used due to its many advantages in terms of performance and price. However, the cathode ray tube television has disadvantages in terms of miniaturization or portability. A display device, which is capable of overcoming the disadvantages of the cathode ray tube television in terms of miniaturization or portability and has advantages such as miniaturization, light weight, and low power consumption, has been attracting attention. For example, a plasma display device, a liquid crystal display device, an organic light emitting display device, and a quantum dot display device have been attracting attention.

The display device may include a display panel and a cover glass for protecting the display panel. A scratch may occur on a surface of the cover glass during a manufacturing process of the display device. When the scratched cover glass is defective, a yield of the display device may be reduced. Accordingly, the cover glass on which the scratch is formed should be repaired.

The above information disclosed in this Background section is only for understanding of the background of the invention, and, therefore, it may contain information that does not constitute prior art.

SUMMARY

Methods of repairing a glass for a display device according to the principles and embodiments of the invention are capable of improving repair quality of scratches of the glass of the display device such that a yield of the display device is increased. The methods of repairing the glass of the display device have improved reliability.

Additional features of the inventive concepts will be set forth in the description which follows, and in part will be apparent from the description, or may be learned by practice of the inventive concepts.

According to an aspect of the invention, a method of repairing a glass for a display device includes disposing the glass including a first surface, a second surface opposite to the first surface, and a scratch formed on the first surface, the scratch of the glass facing toward a gravitational direction, and irradiating a laser on the second surface of the glass.

A transmittance rate of the laser passing through the glass may be greater than an absorption rate of the laser being absorbed in the glass.

The laser may include at least one of a ruby laser, a glass laser, an Nd: YAG laser, a helium-neon laser, an argon laser, a copper vaporized laser, and an excimer laser.

The method may further include disposing a heating plate on the first surface of the glass to overlap the scratch of the glass.

A melting point of the heating plate may be higher than a melting point of the glass.

The heating plate may include at least one of aluminum oxide, molybdenum, tungsten, a nickel-iron alloy such as Invar®, and stainless steel.

A thermal expansion coefficient of the heating plate may be less than a thermal expansion coefficient of the glass.

A thermal conductivity of the heating plate may be greater than a thermal conductivity of the glass.

An size of the heating plate may be greater than a size of the scratch of the glass.

The heating plate may be mirror-like finished.

The heating plate may be reflection-resistance treated.

According to another aspect of the invention, a method of repairing a glass for a display device includes disposing the glass including a first surface, a second surface opposite to the first surface, and a scratch formed on the first surface, disposing to heating plate on the first surface of the glass, and irradiating a laser on the second surface. A transmittance rate of the laser passing through the glass may be greater than an absorption rate of the laser being absorbed in the glass.

The laser may include at least one of a ruby laser, a glass laser, an Nd: YAG laser, a helium-neon laser, an argon laser, a copper vaporized laser, and an excimer laser.

A melting point of the heating plate may be higher than a melting point of the glass.

The heating plate may include at least one of aluminum oxide, molybdenum, tungsten, a nickel-iron alloy such as Invar®, and stainless steel.

A thermal expansion coefficient of the heating plate may be less than a thermal expansion coefficient of the glass.

A thermal conductivity of the heating plate may be greater than a thermal conductivity of the glass.

A size of the heating plate may be greater than a size of the scratch.

The heating plate may be mirror-like finished.

The heating plate may be reflection-resistance treated.

By disposing a glass such that a first surface of the glass on which a scratch is formed faces a gravitational direction, the melted glass by a laser may effectively fill the scratch by gravity.

A rate at which the laser irradiated on a second surface opposite to the first surface transmits the glass is greater than a rate at which the laser is absorbed by the glass so that the laser may reach the first surface. The laser may melt the glass in an adjacent portion of the scratch.

By disposing a heating plate under the first surface of the glass, heat may be effectively transmitted.

According to an area of the heating plate, a volume of the glass to be melted may be adjusted.

It is to be understood that both the foregoing general description and the following detailed description are illustrative and explanatory and are intended to provide further explanation of the inventive concept as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
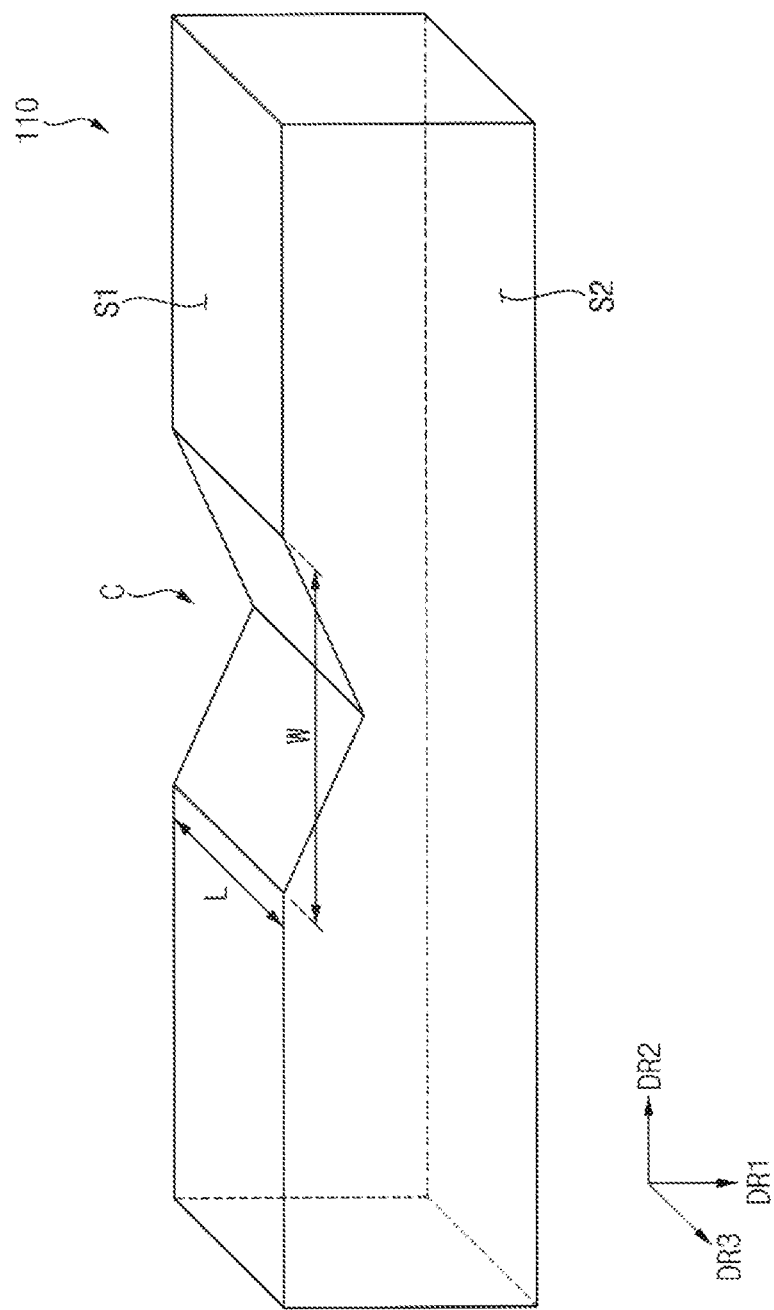
FIG. 1 is a perspective view illustrating a glass for a display device on which the scratch is formed.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Illustrative, non-limiting embodiments will be more clearly understood from the following detailed description in conjunction with the accompanying drawings.

FIG. 1 is a perspective view illustrating a glass on which the scratch is formed. In an embodiment, the glass may be a cover glass for protecting a display panel. The cover glass may be referred to as a window. However, the glass is not limited to the cover glass. For example, the glass may be a glass substrate included in the display panel.

Referring to FIG. 1, a first direction DR1 may be a gravitational direction. A second direction DR2 may intersect the first direction DR1. A third direction DR3 may intersect the first direction DR1 and may intersect the second direction DR2. The second direction DR2 and the third direction DR3 may define a plane. The plane may be perpendicular to the gravitational direction DR1.

The glass 110 may include a first surface S1 and a second surface S2. The first surface S1 may be an upper surface of the glass 110 disposed on the plane, which is defined by the second direction DR2 and the third direction DR3. The second surface S2 may be opposite to the first surface S1, e.g., in the first direction DR1. The second surface S2 may be a lower surface of the glass 110. For example, the first surface S1 may be a front surface of the glass 110, and the second surface S2 may be a rear surface of the glass 110.

The glass 110 may include a scratch C. The scratch C may be formed on the first surface S1 of the glass 110.

Examples of the glass 110 may include tempered glass, borosilicate glass, sapphire glass, quartz glass, soda-lime glass, or the like. These may be used alone or in combination with each other. However, embodiments are not limited thereto.

The scratch C may have a predetermined depth in the first direction DR1 (e.g., the gravitational direction). The scratch C may have a predetermined width W in the second direction DR2. The scratch C may have a predetermined length L in the third direction DR3. The scratch C may have a predetermined depth D. For example, the predetermined width W, length L, and depth D of the scratch C may be maximum values thereof. The scratch C may have a predetermined size. The scratch C may have a predetermined amount (e.g., volume).

A display device may include the glass 110. When the display device is manufactured by using the glass 110, on which the scratch C is formed, display quality of the display device may be degraded or lowered. When the scratch C is formed on the glass 110, a yield of the display device may be reduced. The glass 110 on which the scratch C is formed may be repaired. The predetermined amount (e.g., volume) of the scratch C needs to be filled.

FIGS. 2, 3, 4, and 5 are cross-sectional views illustrating a glass repair method according to an embodiment.

Figure 2:
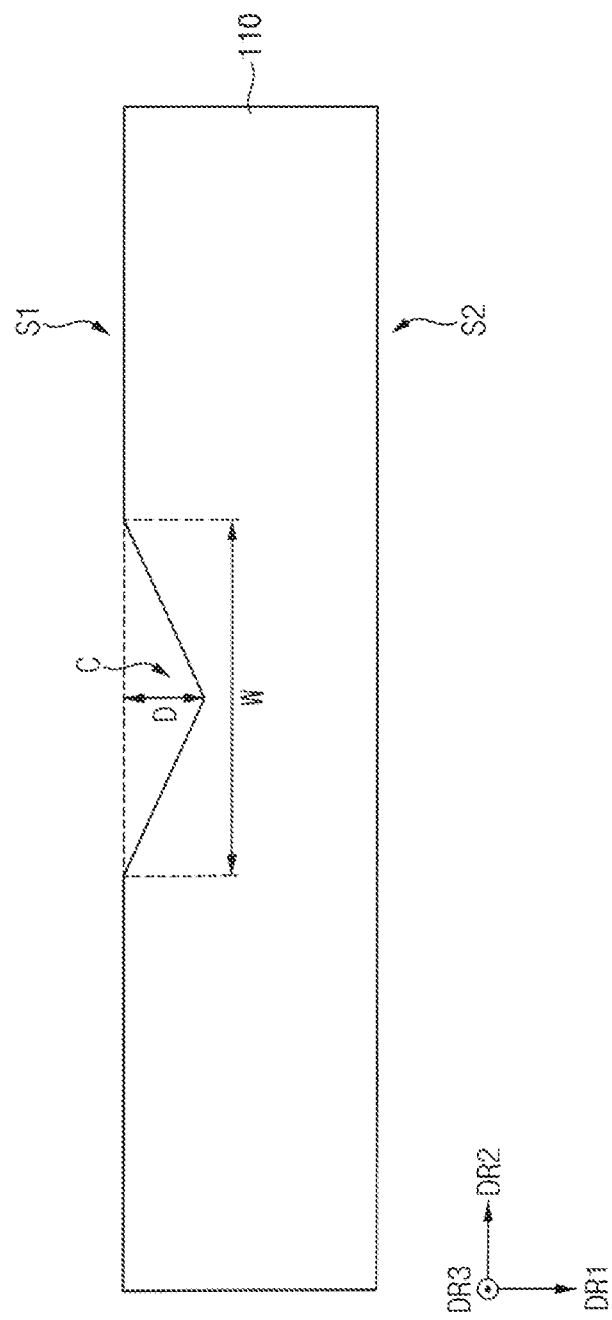
FIGS. 2, 3, 4, and 5 are cross-sectional views illustrating an embodiment of a method of repairing the glass of FIG. 1 according to the principles of the invention.

Referring to FIG. 2, the glass 110 on which the scratch C is formed on the first surface S1 may be provided and/or prepared.

The glass 110 disposed on the plane may include the scratch C formed on the first surface S1 due to a dent or scratch during a manufacturing process of the display device.

Figure 3:
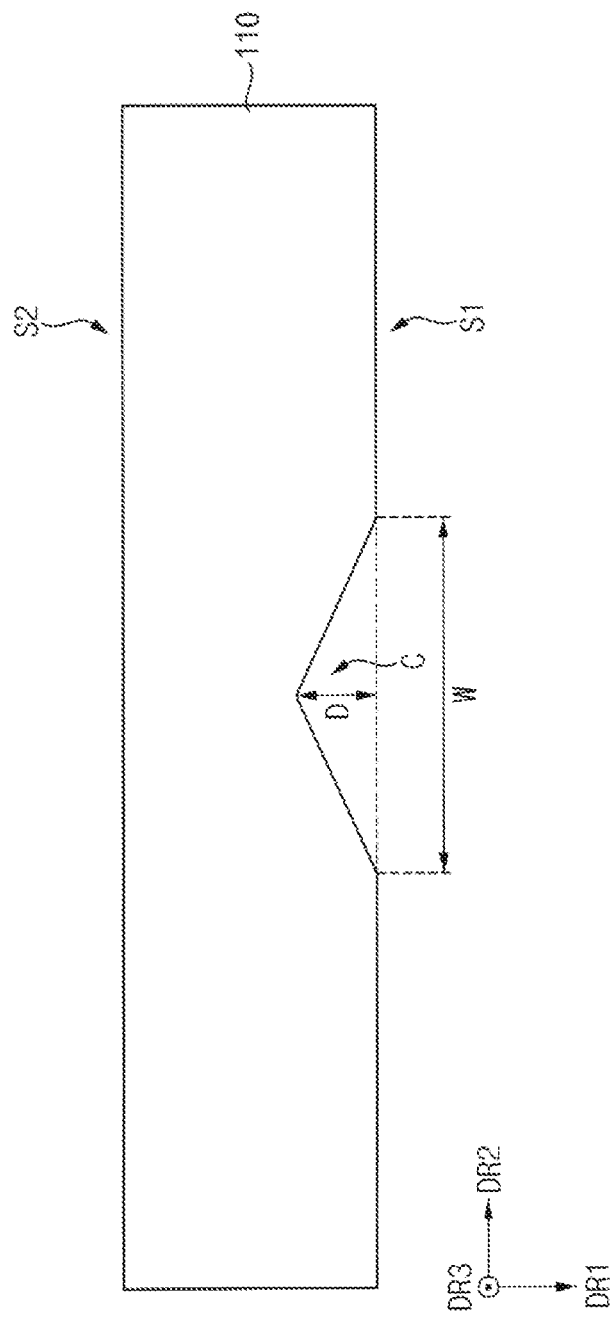

Referring to FIG. 3, a glass repair method according to an embodiment may include turning over the glass 110. In an embodiment, the glass 110 may be disposed such that the first surface S1 faces the first direction DR1 (e.g., the gravitational direction). The glass 110 may be disposed such that a direction from the second surface S2 to the first surface S1 is the first direction DR1 (e.g., the gravitational direction). For example, the scratch C included in the first surface S1 of the glass 110 may be disposed to face the first direction DR1 (e.g., the gravitational direction).

Figure 4:
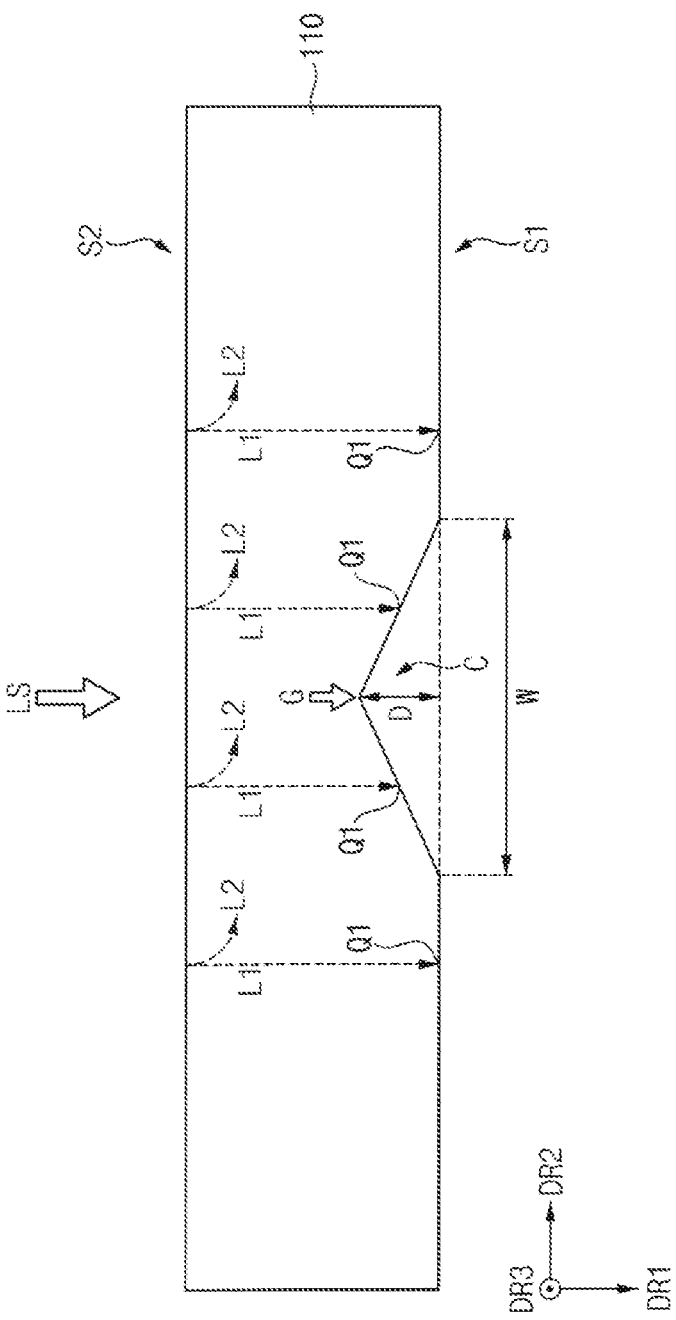

Referring to FIG. 4, a laser LS may be irradiated on the second surface S2 of the glass 110. In an embodiment, the laser LS may be irradiated on the second surface S2 opposite to the first surface S1 on which the scratch C is formed. For example, the laser LS may be irradiated on the scratch C and an area overlapping an adjacent portion of the scratch C.

In an embodiment, a transmittance rate of the laser LS passing through the glass 100 may be greater than an absorption rate of the laser LS being absorbed in the glass 110. A rate at which the laser LS transmits the glass 110 may be greater than a rate at which the laser LS is absorbed by the glass 110. For example, the transmittance rate of the laser LS may be about 90%, and the absorption rate of the laser LS may be about 10%. For example, the transmittance rate of the laser LS may be about 80%, and the absorption rate of the laser LS may be about 20%. However, embodiments are not limited thereto. Examples of the laser LS include a ruby laser, a glass laser, an Nd: YAG laser, a helium-neon laser, an argon laser, a copper vaporized laser, and an excimer laser. These may be used alone or in combination with each other. However, embodiments are not limited thereto.

The laser LS may include a first laser L1 and a second laser L2.

The first laser L1 may be incident on the second surface S2 of the glass 110 and transmitted to the first surface S1 of the glass 110. The first laser L1 may be absorbed by the glass 110 on the first surface S1 of the glass 110.

The second laser L2 may be incident on the second surface S2 of the glass 110, but may not be transmitted to the first surface S1 of the glass 110. The second laser L2 may be absorbed by the glass 110 before reaching the first surface S1 of the glass 110.

The laser LS may be absorbed by the glass 110. For example, the laser LS may be absorbed in all portions of the glass 110 in the first direction DR1 (e.g., the gravitational direction), e.g., between the second surface S2 and the first surface S1.

A wavelength of the laser LS may be about 300 nm to about 2000 nm. The laser LS having the wavelength of about 300 nm to about 2000 nm may have the transmittance rate of the glass 110 of about 80% to about 90%. For example, in borosilicate glass and soda-lime glass, the laser LS having the wavelength of about 300 nm to about 2000 nm may have the transmittance rate of the glass 110 about 80% to about 90%. In various cases where each of a thickness of the borosilicate glass and a thickness of the soda-lime glass is about 0.7 mm, about 2.0 mm, about 5.0 mm, about 13.0 mm, and about 19.0 mm, the laser LS having the wavelength of about 300 nm to about 2000 nm may have the transmittance rate of glass 110 about 80% to about 90%.

Most of the laser LS irradiated on the second surface S2 may be the first laser L1, which is able to reach the first surface S1. A small portion of the laser LS may be the second laser L2, which is not able to reach the first surface S1. Most of the first laser L1 among the laser LS irradiated on the second surface S2 may reach the scratch C of the glass 110 and/or the adjacent portions of the scratch C of the glass 110.

The first laser L1 may be absorbed on the first surface S1 of the glass 110. For example, the first laser L1 may be absorbed on the scratch C and/or on the adjacent portion of the scratch C of the glass 110. The first laser L1 absorbed by the first surface S1 of the glass 110 may generate a first heat Q1. The glass 110 may be melted by the first heat Q1.

Figure 5:
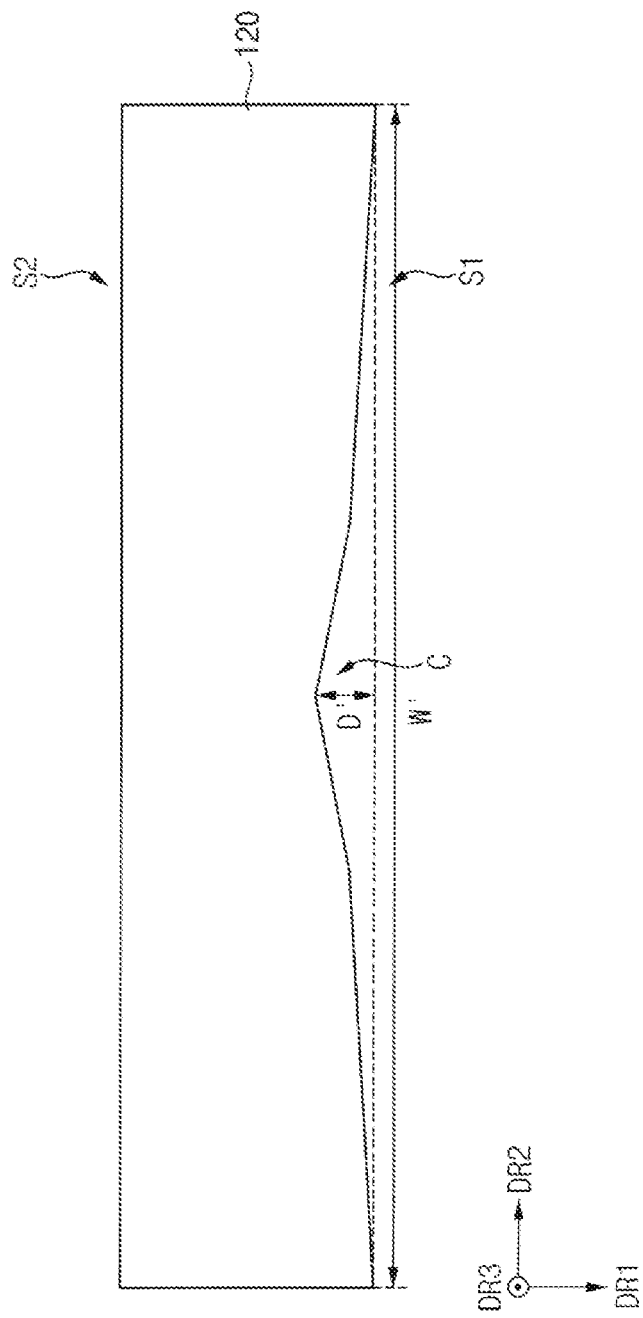

Referring to FIGS. 4 and 5, the glass 110 before being repaired and the glass 120 after being repaired may be illustrated. For example, the glass 110 before being repaired may have the scratch C having a first width W and a first depth D. For example, the glass 110 after being repaired may have the scratch C having a second width W' and a second depth D'. For example, the first width W of the scratch C before being repaired may be smaller than the second width W' of the scratch C after being repaired. For example, the first depth D of the scratch C before being repaired may be greater than the second depth D' of the scratch C after being repaired. However, embodiments are not limited thereto.

The melted glass 110 may fill the scratch C. The melted glass 110 may effectively fill the scratch C by gravity G. The glass 110 may be repaired by the laser LS, and the glass 110 may be effectively repaired by the gravity G. Reliability of the glass repair method according to an embodiment may be improved.

Figure 6:
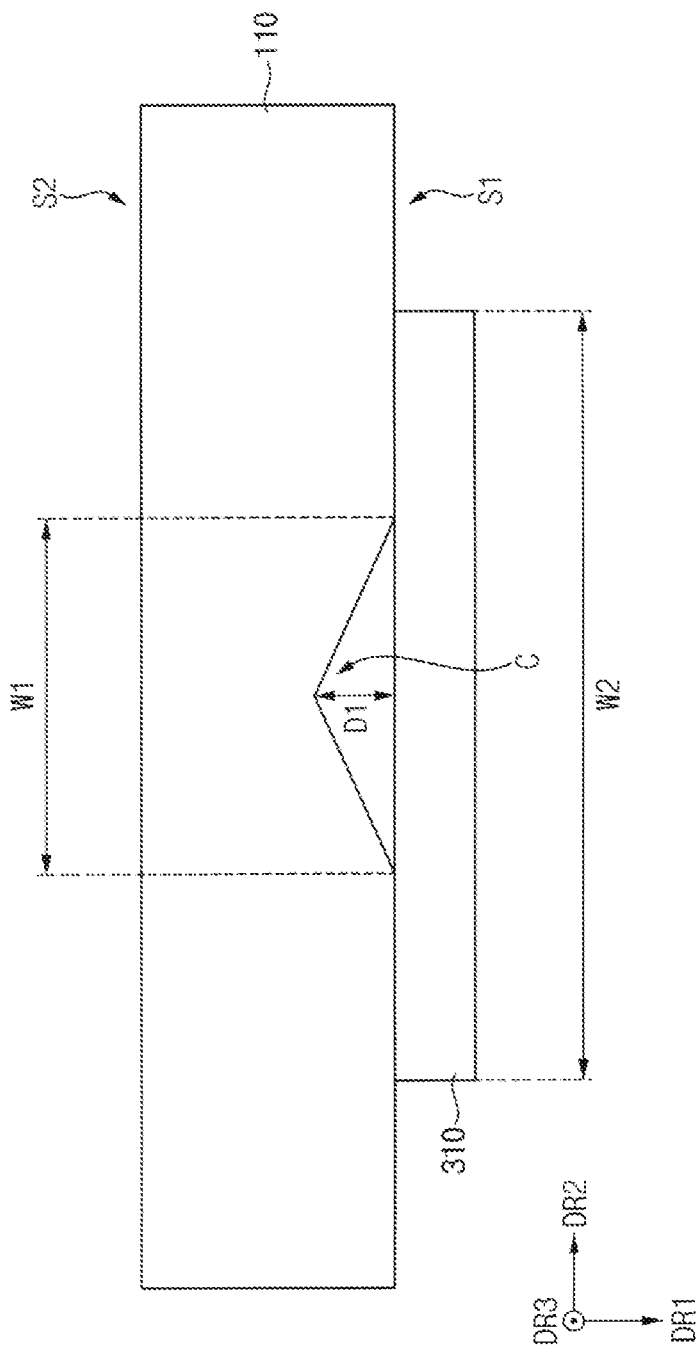
FIGS. 6, 7, and 8 are cross-sectional views illustrating another embodiment of the method of repairing the glass of FIG. 1 according to the principles of the invention.
Figure 7:
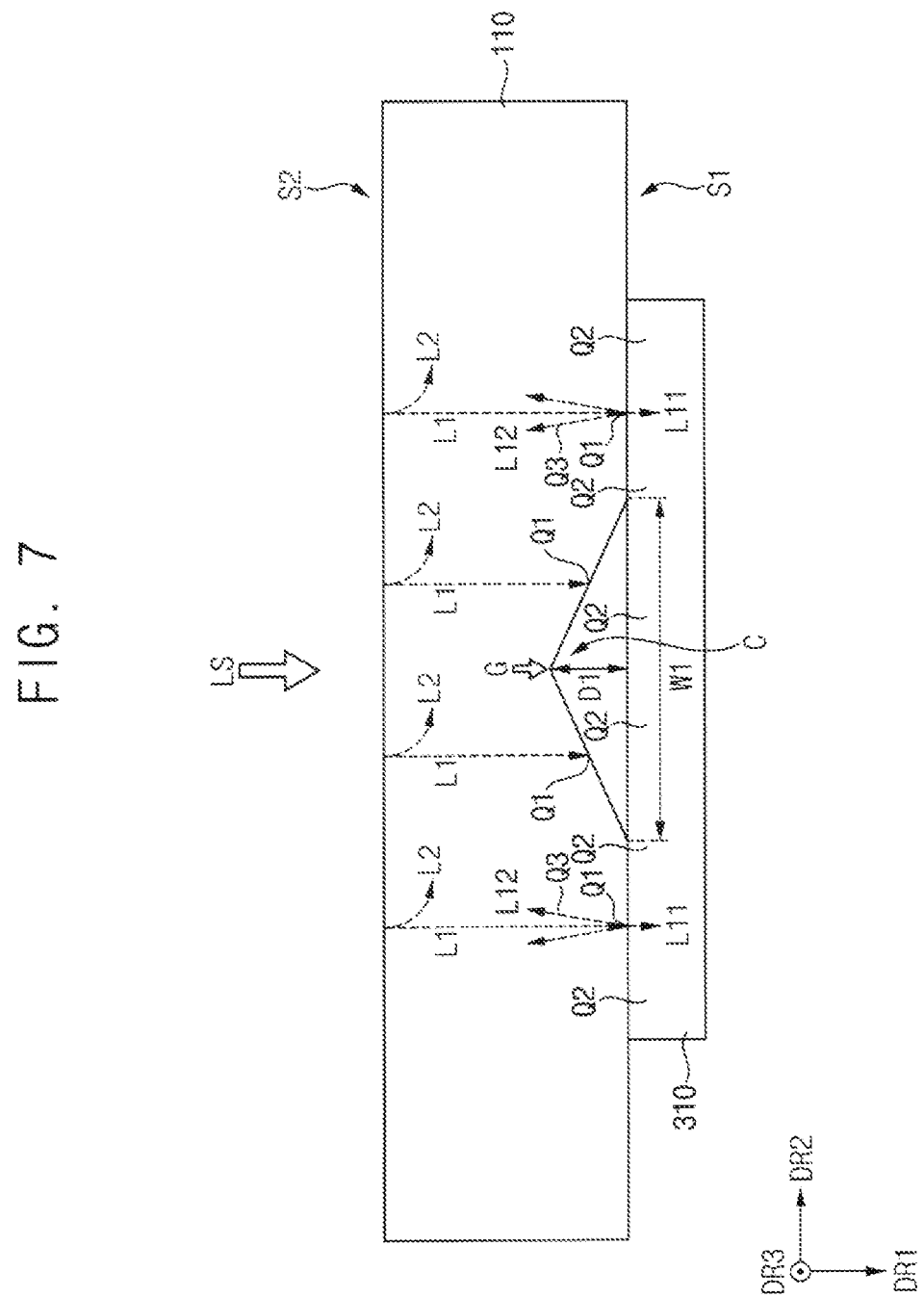
Figure 8:
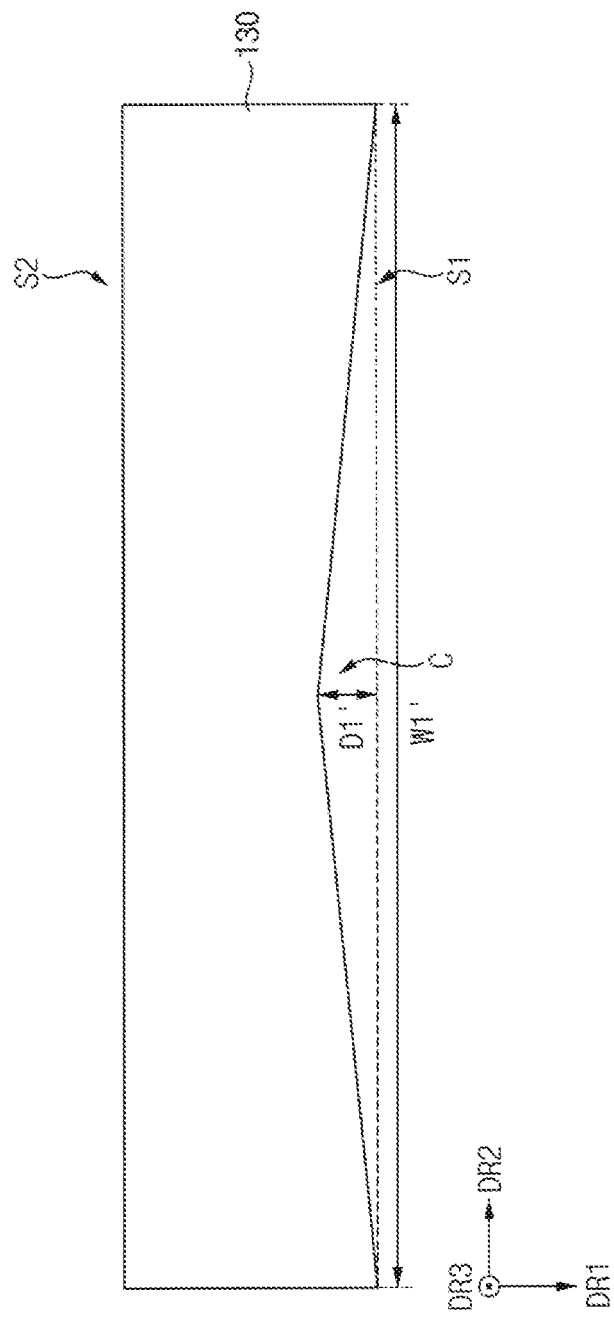

FIGS. 6, 7, and 8 are cross-sectional views illustrating a glass repair method according to another embodiment. Since the glass repair method according to another embodiment is the same as the glass repair method according to an embodiment except for disposing a heating plate, the same description will be omitted for descriptive convenience. The glass repair method according to another embodiment may include turning over the glass 110 illustrated in FIG. 1.

Referring to FIG. 6, the glass repair method according to another embodiment may include disposing a heating plate 310. The heating plate 310 may be disposed under the inverted glass 110. The heating plate 310 may be disposed under the first surface S1 of the glass 110. The heating plate 310 may be disposed adjacent to the scratch C formed on the first surface S1. The heating plate 310 may overlap the scratch C, e.g., in the first direction DR1. The heating plate 310 may contact the glass 110. The heating plate 310 may contact the first surface S1 of the glass 110. The heating plate 310 may contact the first surface S1, which is adjacent to the scratch C.

In an embodiment, a size (e.g., area) of the heating plate 310 may be greater than a size (e.g., area) of the scratch C. On the plane defined by the second direction DR2 and the third direction DR3, the size (e.g., area) of the heating plate 310 may be greater than the size (e.g., area) of the scratch C. For example, a width W2 of the heating plate 310 in the second direction DR2 may be greater than a width W1 of the scratch C in the second direction DR2. For example, a length of the heating plate 310 in the third direction DR3 may be greater than a length of the scratch C in the third direction DR3.

Referring to FIG. 7, a portion of the first laser L1 may be absorbed by the glass 110 on the first surface S1. The portion of the first laser L1 absorbed by the first surface S1 may generate the first heat Q1. The first heat Q1 may melt the glass 110.

Another portion of the first laser L1 may include a first-first laser L11 and a first-second laser L12. The first laser L1, which is not absorbed by the glass 110 on the first surface S1, may include the first-first laser L11 and the first-second laser L12.

The first-first laser L11 may be absorbed by the heating plate 310. The first-first laser L11 may be absorbed by the heating plate 310 at the scratch C and/or the adjacent portion of the scratch C. The first-first laser L11 absorbed by the heating plate 310 may generate a second heat Q2. The second heat Q2 may be transmitted to the glass 110. The second heat Q2 may melt the glass 110.

The first-second laser L12 may be reflected from the heating plate 310. The reflected first-second laser L12 may be absorbed by the glass 110. The first-second laser L12 may be absorbed by the glass 110 at the scratch C and/or at the adjacent portion of the scratch C. The first-second laser L12 absorbed by the glass 110 may generate a third heat Q3. The third heat Q3 may melt the glass 110.

The glass 110 may be melted by the first heat Q1, the second heat Q2, and the third heat Q3. The melted glass 110 may fill the scratch C. The melted glass 110 may effectively fill the scratch C by the gravity G.

The second heat Q2 and the third heat Q3 may be generated in an adjacent portion of the heating plate 310. The amount (e.g., volume) of the melted glass 110 may be adjusted according to the size (e.g., area) of the heating plate 310. The amount (e.g., volume) of the melted glass 110 may be selected according to the width, the length, and the depth of the scratch C. The area of the heating plate 310 may be selected according to the amount (e.g., volume) of the scratch C. For example, the width of the heating plate 310 may be about 110% to about 200% of the width of the scratch C.

According to the type of the glass 110 such as the tempered glass, the borosilicate glass, the sapphire glass, the quartz glass, soda-lime glass, or the like, a melting point of the glass 110 may have a range of about 1200° C. to about 1600° C. In an embodiment, a melting point of the heating plate 310 may be higher than the melting point of the glass 110. The glass 110 may be melted before the heating plate 310 is melted by the heat Q1, Q2, and Q3 generated by the laser LS being absorbed.

The heating plate 310 may include a material having a melting point higher than the melting point of the glass 110. Examples of the material included in the heating plate 310 include aluminum oxide (Al2O3), molybdenum, tungsten, a nickel-iron alloy such as Invar®, and stainless steel (SUS). These may be used alone or in combination with each other. However, the material included in the heating plate 310 is not limited thereto. The nickel-iron alloy may be Invar 36® (FeNi36 or 64FeNi), which may include an austenitic nickel-iron alloy containing 36% nickel. A melting point of the Invar 36® is about 1430° C.

The stainless steel may be stainless steel 304 (SUS 304), which may include both chromium (between 18% and 20%) and nickel (between 8% and 10.5%). A melting point of the stainless steel 304 is about 1400° C. to about 1420° C.

When a melting point of the material (e.g., metal) of the heating plate 310 metal is lower than the melting point of the glass 110, the heating plate 310 may include an oxide of the material (e.g., metal). For example, since a melting point of aluminum is about 660.3° C., which is lower than the melting point of the glass 110, the heating plate 310 may include the aluminum oxide (Al2O3).

Due to the heat Q1, Q2, and Q3 generated by the laser LS being absorbed, the glass 110 may expand in the first direction DR1 (e.g., gravitational direction). A thermal expansion coefficient of the glass 110 is about 10×10−6 m/(m ° C.). In an embodiment, a thermal expansion coefficient of the heating plate 310 may be less than the thermal expansion coefficient of the glass 110. The heating plate 310 may not suppress or prevent the expansion of the glass 110.

The heating plate 310 may include a material having a thermal expansion coefficient less than the thermal expansion coefficient of the glass 110. Examples of the material included in the heating plate 310 include aluminum oxide (Al2O3), molybdenum, tungsten, and a nickel-iron alloy such as Invar®. These may be used alone or in combination with each other. However, the material included in the heating plate 310 is not limited thereto.

In an embodiment, a thermal conductivity of the heating plate 310 may be greater than a thermal conductivity of the glass 110. The second heat Q2 may be effectively transmitted from the heating plate 310 toward the glass 110.

Referring to FIGS. 7 and 8, the glass 110 before being repaired and the glass 120 after being repaired may be illustrated. For example, the glass 110 before being repaired may have the scratch C having a first width W1 and a first depth D1. For example, the glass 110 after being repaired may have the scratch C having a second width W1' and a second depth D1'. For example, the first width W1 of the scratch C before being repaired may be smaller than the second width W1' of the scratch C after being repaired. For example, the first depth D1 of the scratch C before being repaired may be greater than the second depth D1' of the scratch C after being repaired. However, embodiments are not limited thereto.

The melted glass 110 may fill the scratch C. The melted glass 110 may effectively fill the scratch C by the gravity G. The glass 110 may be repaired by the laser LS. The glass 110 may be effectively repaired by the gravity G and the heating plate 310. The reliability of the glass repair method according to another embodiment may be improved.

Figure 9:
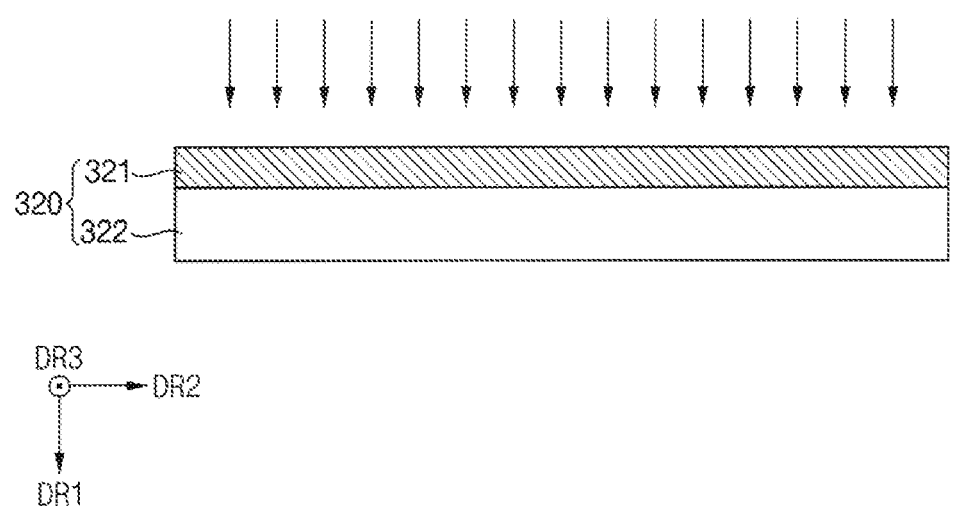
FIGS. 9, 10, and 11 are cross-sectional views illustrating still another embodiment of the method of repairing the glass of FIG. 1 according to the principles of the invention.
Figure 10:
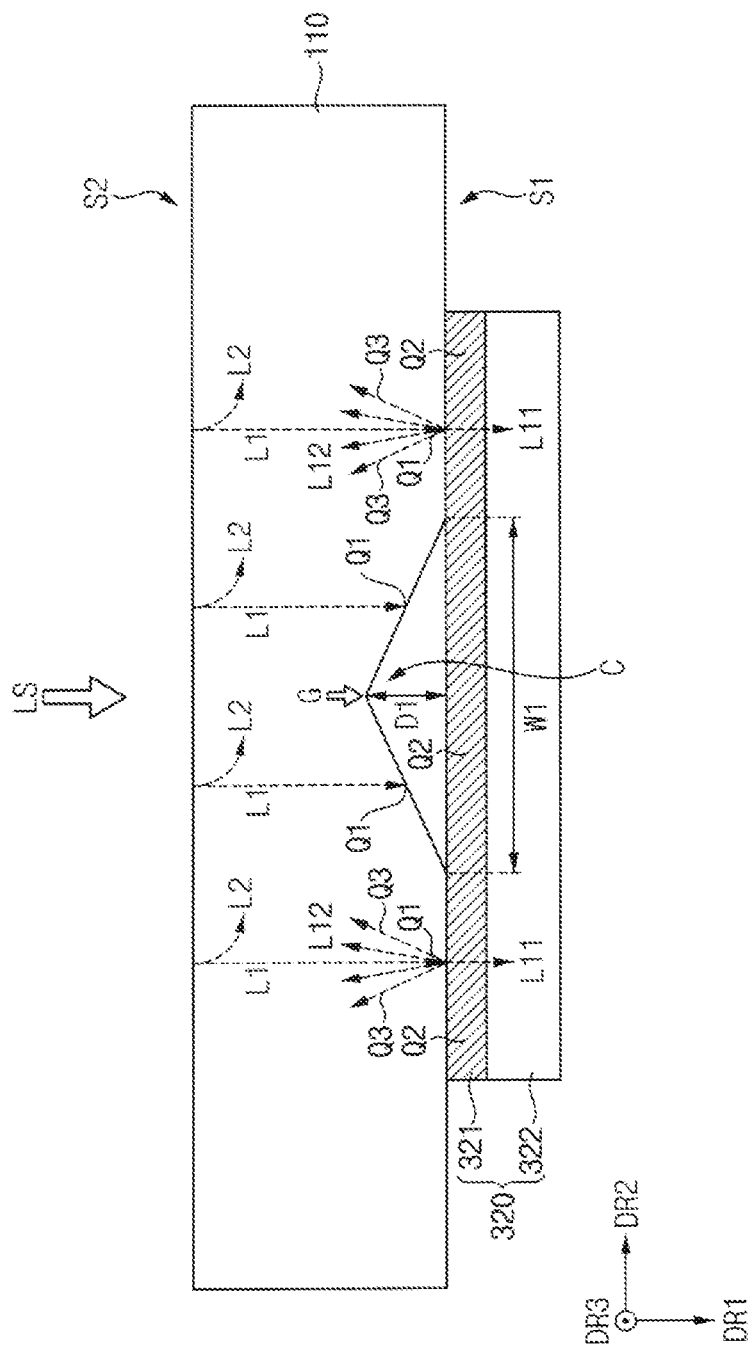
Figure 11:
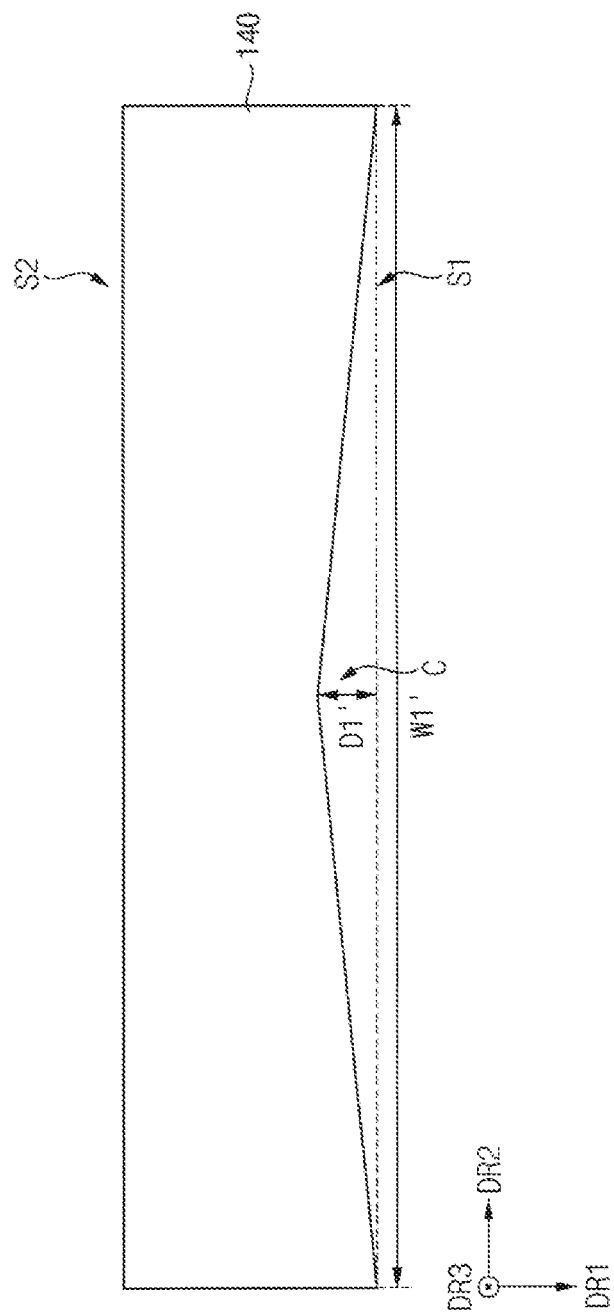

FIGS. 9, 10, and 11 are cross-sectional views illustrating a glass repair method according to still another embodiment. Since the glass repair method according to still another embodiment is the same as the glass repair method according to another embodiment except for mirror-like finishing a heating plate, the same description will be omitted for descriptive convenience. The glass repair method according to still another embodiment may include turning over the glass 110 illustrated in FIG. 3 and disposing a heating plate illustrated in FIG. 6.

Referring to FIG. 9, the glass repair method according to still another embodiment may further include mirror-like finishing a heating plate 310. In an embodiment, before disposing the heating plate 310 under the first surface S1 of the glass 110, the heating plate 310 may be mirror-like finished.

A mirror-like finished heating plate 320 may include a first portion 321 and a second portion 322. The first portion 321 may be a portion having an increased reflectance by being mirror-like finished. The reflectance of the first portion 321 of the mirror-like finished heating plate 320 may be greater than reflectance of the non-mirror-like finished heating plate 310. The reflectance of the second portion 322 may be substantially the same as the reflectance of the heating plate 310 before the mirror-like finishing.

Referring to FIG. 10, by the mirror-like finished heating plate 320, the amount of light of the first-second laser L12 reflected from the heating plate 320 may be increased. The third heat Q3 generated by the first-second laser L12 may increase.

Referring to FIGS. 10 and 11, the glass 110 before being repaired and the glass 120 after being repaired may be illustrated. For example, the glass 110 before being repaired may have the scratch C having a first width W1 and a first depth D1. For example, the glass 110 after being repaired may have the scratch C having a second width W1' and a second depth D1'. For example, the first width W1 of the scratch C before being repaired may be smaller than the second width W1' of the scratch C after being repaired. For example, the first depth D1 of the scratch C before being repaired may be greater than the second depth D1' of the scratch C after being repaired. However, embodiments are not limited thereto.

The glass 110 may be efficiently melted by the first heat Q1, the second heat Q2, and the increased third heat Q3. The melted glass 110 may fill the scratch C. The melted glass 110 may effectively fill the scratch C by the gravity G.

The glass 110 may be repaired by the laser LS. The glass 110 may be effectively repaired by the gravity G and the mirror-like finished heating plate 320. The reliability of the glass repair method according to still another embodiment may be improved.

Figure 12:
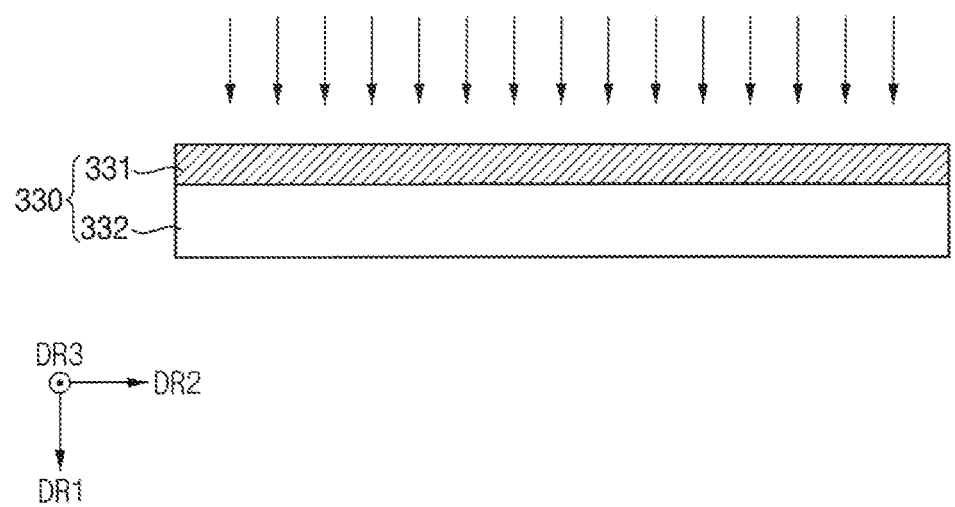
FIGS. 12, 13, and 14 are cross-sectional views illustrating still another embodiment of the method of repairing the glass of FIG. 1 according to the principles of the invention.
Figure 13:
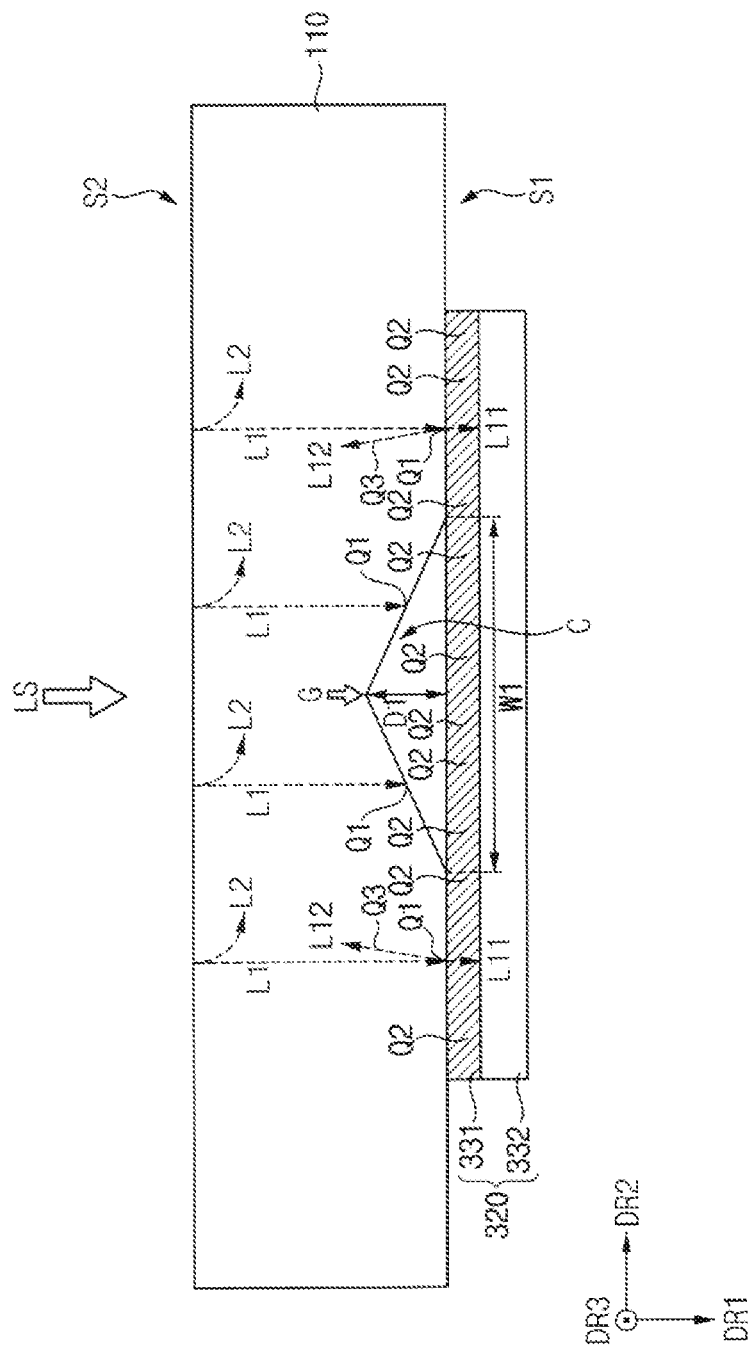
Figure 14:
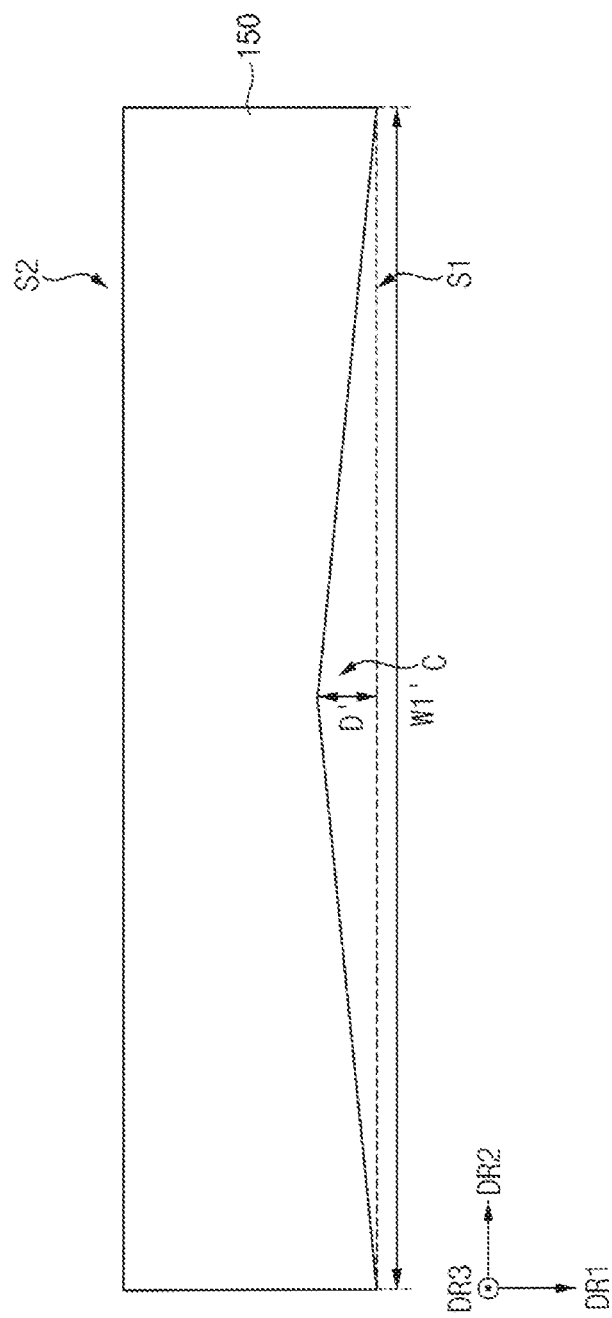

FIGS. 12, 13, and 14 are cross-sectional views illustrating a glass repair method according to still another embodiment. Since the glass repair method according to still another embodiment is the same as the glass repair method according to another embodiment except for anti-reflection treatment on the heating plate, the same description will be omitted for descriptive convenience. The glass repair method according to still another embodiment may include turning over the glass 110 illustrated in FIG. 3 and disposing a heating plate illustrated in FIG. 6.

Referring to FIG. 12, the glass repair method according to still another embodiment may further include reflection-resistance treating the heating plate 310. In an embodiment, before disposing the heating plate 310 under the first surface S1 of the glass 110, the heating plate 310 may be reflection-resistance treated.

A reflection-resistance treated heating plate 330 may include a first portion 331 and a second portion 332. The first portion 331 may be a portion having a reduced reflectance by reflection-resistance treating. The reflectance of the first portion 331 of the reflection-resistance treated heating plate 330 may be less than reflectance of the non-reflection-resistance treated heating plate 310. The reflectance of the second portion 332 may be substantially the same as the reflectance of the heating plate 310 before the reflection-resistance treating.

Referring to FIG. 13, by reflection-resistance treated heating plate 330, the amount of light of the first-first laser L11 absorbed by the heating plate 330 may be increased. The second heat Q2 generated by the first-first laser L11 may increase.

Referring to FIGS. 13 and 14, the glass 110 before being repaired and the glass 120 after being repaired may be illustrated. For example, the glass 110 before being repaired may have the scratch C having a first width W1 and a first depth D1. For example, the glass 110 after being repaired may have the scratch C having a second width W1' and a second depth D1'. For example, the first width W1 of the scratch C before being repaired may be smaller than the second width W1' of the scratch C after being repaired. For example, the first depth D1 of the scratch C before being repaired may be greater than the second depth D1' of the scratch C after being repaired. However, embodiments are not limited thereto.

The glass 110 may be effectively melted by the first heat Q1, the increased second heat Q2, and the third heat Q3. The melted glass 110 may fill the scratch C. The melted glass 110 may effectively fill the scratch C by the gravity G.

The glass 110 may be repaired by the laser LS. The glass 110 may be effectively repaired by the gravity G and the reflection-resistance treated heating plate 330. The reliability of the glass repair method according to still another embodiment may be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of repairing a glass for a display device, the method comprising:
   providing the glass comprising a first surface, a second surface opposite to the first surface, and a scratch formed on the first surface;
   positioning the glass such that the scratch of the glass faces toward a gravitational direction; and
   irradiating a laser on the second surface of the glass to repair the glass,
   wherein the laser irradiates the scratch and portions of the first surface around the scratch.

2. The method of claim 1, wherein a transmittance rate of the laser passing through the glass is greater than an absorption rate of the laser being absorbed in the glass.

3. The method of claim 2, wherein the laser comprises at least one of a ruby laser, a glass laser, an Nd: YAG laser, a helium-neon laser, an argon laser, a copper vaporized laser, and an excimer laser.

4. The method of claim 1, further comprising:
   disposing a heating plate on the first surface of the glass to overlap the scratch of the glass.

5. The method of claim 4, wherein a melting point of the heating plate is higher than a melting point of the glass.

6. The method of claim 5, wherein the heating plate comprises at least one of aluminum oxide, molybdenum, tungsten, a nickel-iron alloy, and stainless steel.

7. The method of claim 4, wherein a thermal expansion coefficient of the heating plate is less than a thermal expansion coefficient of the glass.

8. The method of claim 4, wherein a thermal conductivity of the heating plate is greater than a thermal conductivity of the glass.

9. The method of claim 4, wherein a size of the heating plate is greater than a size of the scratch of the glass.

10. The method of claim 4, wherein the heating plate is mirror-like finished.

11. The method of claim 4, wherein the heating plate is reflection-resistance treated.

12. A method of repairing a glass for a display device, the method comprising:
    providing the glass comprising a first surface and a second surface opposite to the first surface, and a scratch formed on the first surface;
    disposing a heating plate on the first surface of the glass; and
    irradiating a laser on the second surface of the glass to repair the glass,
    wherein a transmittance rate of the laser passing through the glass is greater than an absorption rate of the laser being absorbed in the glass, and
    wherein the laser irradiates the scratch and portions of the first surface around the scratch.

13. The method of claim 12, wherein the laser comprises at least one of a ruby laser, a glass laser, an Nd: YAG laser, a helium-neon laser, an argon laser, a copper vaporized laser, and an excimer laser.

14. The method of claim 12, wherein a melting point of the heating plate is higher than a melting point of the glass.

15. The method of claim 14, wherein the heating plate comprises at least one of aluminum oxide, molybdenum, tungsten, a nickel-iron alloy, and stainless steel.

16. The method of claim 12, wherein a thermal expansion coefficient of the heating plate is less than a thermal expansion coefficient of the glass.

17. The method of claim 12, wherein a thermal conductivity of the heating plate is greater than a thermal conductivity of the glass.

18. The method of claim 12, wherein a size of the heating plate is greater than a size of the scratch of the glass.

19. The method of claim 12, wherein the heating plate is mirror-like finished.

20. The method of claim 12, wherein the heating plate is reflection-resistance treated.

* * * * *